US009290172B2

(12) United States Patent
Tsuchida et al.

(10) Patent No.: US 9,290,172 B2
(45) Date of Patent: Mar. 22, 2016

(54) COLLISION MITIGATION DEVICE

(71) Applicant: DENSO CORPORATION, Kariya, Aichi-pref. (JP)

(72) Inventors: Norio Tsuchida, Kariya (JP); Jun Tsuchida, Toyota (JP); Masayuki Shimizu, Toyota (JP)

(73) Assignees: DENSO CORPORATION, Kariya, Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/260,660

(22) Filed: Apr. 24, 2014

(65) Prior Publication Data

US 2014/0324287 A1     Oct. 30, 2014

(30) Foreign Application Priority Data

Apr. 26, 2013   (JP) .................................. 2013-093827

(51) Int. Cl.
*G06F 17/10* (2006.01)
*G05B 23/02* (2006.01)
(Continued)

(52) U.S. Cl.
CPC ............. *B60W 10/184* (2013.01); *B60W 10/20* (2013.01); *B60W 30/09* (2013.01); *B60W 30/095* (2013.01); *B60W 30/085* (2013.01); *B60W 30/18163* (2013.01)

(58) Field of Classification Search
CPC .................. B60W 2420/403; B60W 2420/42; B60W 2520/10; B60W 2520/14; B60W 2550/308; B60W 30/085; B60W 10/184; B60W 2540/30; B60W 2550/302; B60W 30/08; B60W 30/095; B60W 30/12; B60W 40/02; B60W 40/08; H04W 74/0816; H04W 52/46; H04W 52/50; Y02B 60/50
USPC ............ 701/36, 300, 301; 340/903, 436, 3.41
See application file for complete search history.

(56) References Cited

U.S. PATENT DOCUMENTS

2004/0199327 A1   10/2004   Isogai et al.
2005/0125121 A1 *  6/2005   Isaji ...................... B60W 30/08
                                                        701/36
(Continued)

FOREIGN PATENT DOCUMENTS

JP        07-230600       8/1995
JP        2002-131425     5/2002
(Continued)

OTHER PUBLICATIONS

Office Action dated Mar. 10, 2015 in corresponding Japanese Application No. 2013-093827.

*Primary Examiner* — Muhammad Shafi
(74) *Attorney, Agent, or Firm* — Harness, Dickey & Pierce, P.L.C.

(57) ABSTRACT

A collision mitigation device sets an actuation condition indicating a condition for actuating a collision mitigating section configured to mitigate collision damage when an own vehicle is in a collision. A target object is positioned near the own vehicle and detected. The collision mitigating section is actuated when a positional relationship between the own vehicle and the target object meets the actuation condition. The collision mitigation device recognizes an own vehicle traveling segment that indicates a traveling segment of a road on which the own vehicle is traveling, and recognizes whether or not the target object is present within the own vehicle traveling segment. The actuation condition is relaxed in such a manner that the collision mitigating section is more easily actuated when the target object is present within the own vehicle traveling segment, compared to when the target object is not present within the own vehicle traveling segment.

10 Claims, 4 Drawing Sheets

(51) Int. Cl.
*B60W 10/184* (2012.01)
*B60W 10/20* (2006.01)
*B60W 30/09* (2012.01)
*B60W 30/095* (2012.01)
*B60W 30/085* (2012.01)
*B60W 30/18* (2012.01)

(56) References Cited

U.S. PATENT DOCUMENTS

2009/0018740 A1* 1/2009 Noda .................. B60T 7/22
 701/70
2009/0105925 A1* 4/2009 Harada ............ G08G 1/096783
 701/99
2009/0204304 A1* 8/2009 Urban .................. B60W 40/04
 701/96

FOREIGN PATENT DOCUMENTS

| | | |
|---|---|---|
| JP | 2004-118730 | 4/2004 |
| JP | 2004-136785 | 5/2004 |
| JP | 2004-259151 | 9/2004 |
| JP | 2008-308036 | 12/2008 |
| JP | 2010-003002 | 1/2010 |
| JP | 2011-051570 | 3/2011 |
| JP | 2011-121548 | 6/2011 |

* cited by examiner

COLLISION MITIGATION DEVICE

CROSS-REFERENCE TO RELATED APPLICATION

This application is based on and claims the benefit of priority from Japanese Patent Application No. 2013-093787, filed Apr. 26, 2013, the disclosure of which is incorporated herein in its entirety by reference.

BACKGROUND

1. Technical Field

The present invention relates to a collision mitigation device for a vehicle that mitigates collision damage when an own vehicle is in a collision.

2. Related Art

As the above-described collision mitigation apparatus, a configuration is known in which collision probability is determined based on an overlap rate under an assumption that a collision occurs between the own vehicle and another vehicle. The collision mitigation apparatus performs control to mitigate collision damage from the collision based on the collision probability (for example, refer to JP-A-2008-308036).

However, in the above-described collision mitigation apparatus, whether or not another vehicle is present in an area in which the own vehicle should travel is not considered. Therefore, even in a situation in which the likelihood is high that the own vehicle will avoid collision, the collision probability may be found to be similar and control may be performed. A situation in which the likelihood is high that the own vehicle will avoid collision is, for example, an instance in which the own vehicle temporarily faces the direction of another vehicle but the other vehicle is a vehicle parked on the shoulder of a road. In other words, there is a problem in that the collision mitigation device is unable to appropriately determine whether or not to perform control.

SUMMARY

It is thus desired to provide a collision mitigation apparatus for a vehicle that mitigates collision damage when the own vehicle is in a collision, and is capable of appropriately determining whether or not to perform control.

An exemplary embodiment provides a collision mitigation device that is mounted in an own vehicle and mitigates collision damage when the own vehicle is in a collision. The collision mitigation device includes actuation condition setting means, actuation control means, traveling segment recognizing means, and in-segment presence recognizing means. The actuation condition setting means sets an actuation condition that indicates a condition for actuating a collision mitigating section that is used to mitigate collision damage when the own vehicle is in a collision. The actuation control means detects a target object that is positioned near the own vehicle, and actuates the collision mitigating section when a positional relationship between the own vehicle and the target object meets the actuation condition.

The traveling segment recognizing means recognizes an own vehicle traveling segment that indicates a traveling segment of a road on which the own vehicle is traveling. The in-segment presence recognizing means recognizes whether or not the target object is present within the own vehicle traveling segment. In this configuration, the actuation condition setting means relaxes the actuation condition when the target object is present within the own vehicle traveling segment, compared to when the target object is not present within the own vehicle traveling segment.

According to the collision mitigation device such as this, the magnitude of the possibility of a collision with the target object is judged based on whether or not the target object is present within the own vehicle traveling segment. Therefore, whether or not to perform control can be more appropriately determined. In particular, when the target object is present within the own vehicle traveling segment, the possibility of a collision is considered higher than when the target object is not present within the own vehicle traveling segment. The actuation condition for the collision mitigating section is relaxed. Therefore, the collision mitigating section can be actuated at an earlier stage.

DESCRIPTION OF THE EMBODIMENTS

A collision mitigation device according to an embodiment will hereinafter be described with reference to the drawings.

Figure 1:
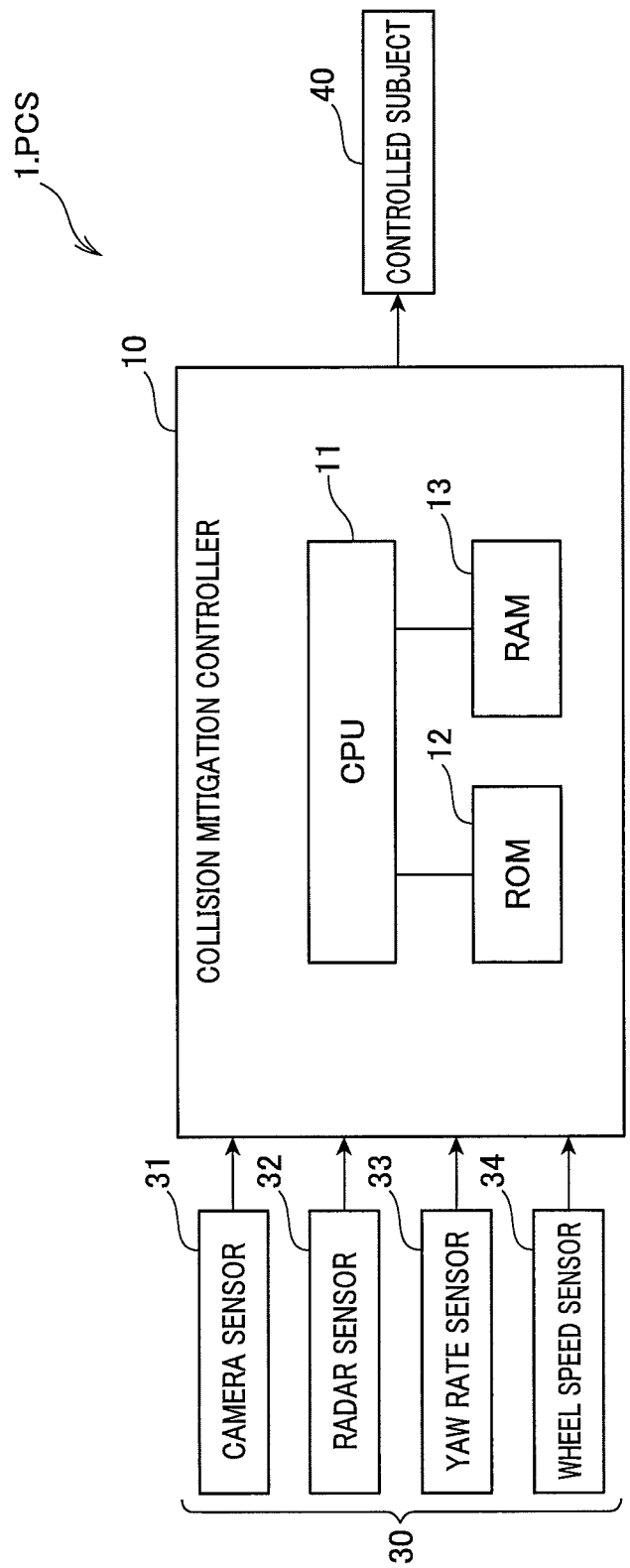
FIG. 1 is a block diagram of an overall configuration of a pre-crash safety system 1 to which a collision mitigation device according to the present embodiment is applied.

As shown in FIG. 1, the collision mitigation device of the present embodiment is applied to a pre-crash safety system (hereinafter referred to as PCS) 1. The PCS 1 is a system that is installed in a vehicle, such as a passenger car. For example, the PCS 1 detects the risk of collision of the vehicle and suppresses collision of the vehicle. In addition, should the vehicle be in a collision, the PCS 1 mitigates damage from the collision. Specifically, as shown in FIG. 1, the PCS 1 includes a collision mitigation controller 10, various sensors 30, and a controlled subject (corresponding to a collision mitigating section) 40.

The various sensors 30 include, for example, a camera sensor 31, a radar sensor 32, a yaw rate sensor 33, and a wheel speed sensor 34. The camera sensor 31 is configured, for example, as a stereo camera that is capable of detecting the distance to a target object. The camera sensor 31 recognizes the shape of the target object and the distance to the target object based on captured images. The target object is, for example, a pedestrian, an on-road obstruction, or another vehicle that is captured in the images.

The radar sensor 32 detects a target object and the position of the target object (relative position to the own vehicle). The yaw rate sensor 33 is configured as a known yaw rate sensor that detects the yaw rate of the vehicle.

The wheel speed sensor 34 detects the rotation frequency of the wheels, or in other words, the traveling speed of the vehicle. The detection results from the various sensors 30 are acquired by the collision mitigation controller 10. The camera sensor 31 and the radar sensor 32 detect target objects positioned in the traveling direction of the vehicle at a predetermined interval (such as 100 ms) set in advance. In addition, the radar sensor 32 also detects the shape and size of the target object by emitting electromagnetic waves which have directivity to the target object and receiving reflection waves of the emitted electromagnetic waves.

The collision mitigation controller 10 is configured as a known computer. The computer includes a central processing unit (CPU) 11, a read-only memory (ROM) 12, a random access memory (RAM) 13, and the like. The collision mitigation controller 10 runs a program that is stored in the ROM 12, based on the detection results from the various sensors 30 and the like. The collision mitigation controller 10 thereby performs various processes, such as a collision mitigation process, described hereafter.

The collision mitigation controller 10 performs such processes and operates the controlled subject 40 based on the processing results of the processes. The controlled subject 40 includes, for example, an actuator that drives a braking, a steering, a seatbelt or the like, and a warning device that issues a warning. According to the present embodiment, an instance in which the controlled subject 40 is the braking system will be described hereafter.

As described above, when the CPU 11 actuates a function of automatic braking, the CPU 11 actuates the controlled subject 40 to achieve a deceleration rate and a deceleration amount (the difference in speed before and after actuation of automatic braking) set in advance, based on a detection signal from the wheel speed sensor 34.

Next, the collision mitigation process will be described with reference to FIG. 2 and subsequent drawings. The collision mitigation process is performed when automatic braking is performed. The collision mitigation process is started at a predetermined interval (such as about 50 ms) set in advance.

Figure 2:
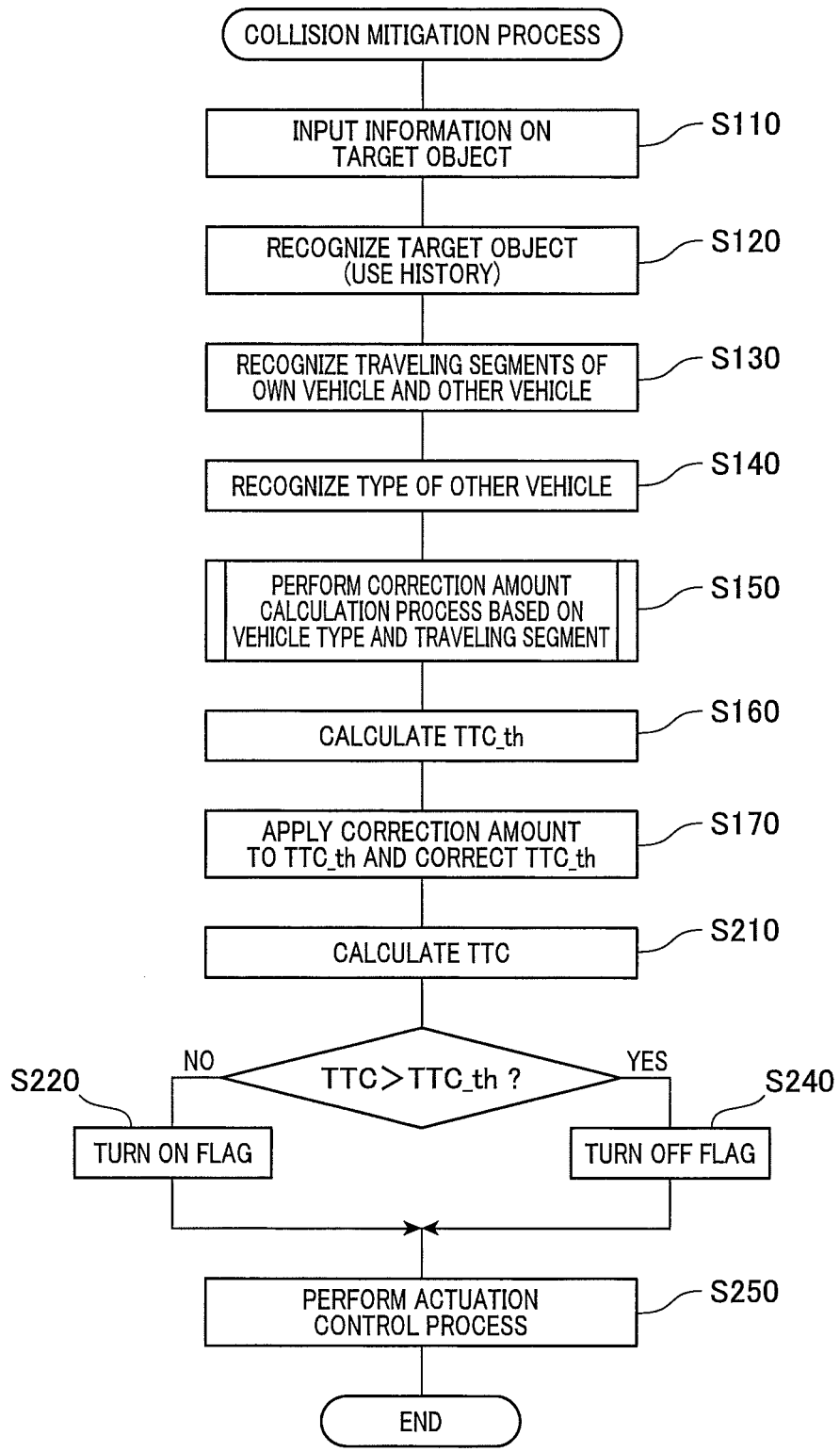
FIG. 2 is a flowchart of a collision mitigation process performed by a CPU of a collision mitigation controller shown in FIG. 1.

Specifically, as shown in FIG. 2, in the collision mitigation process, first, the CPU 11 of the collision mitigation controller 10 inputs information on a target object (step S110). In this processing operation, the latest information on the position of the target object detected by the camera sensor 31 and the radar sensor 32 is acquired.

Then, the CPU 11 performs recognition of the target object (step S120). In this processing operation, the type of target object (such as a vehicle, a pedestrian, a bicycle, or a motorcycle) is recognized based on the shape and the like of the target object acquired from the camera sensor 31 (such as by pattern matching). A target object that has been previously recorded in the RAM 13 or the like and the target object that is recognized at this time are then associated. In addition, in this processing operation, the behavior of each target object, the positional relationship (coordinates of the target object with reference to the own vehicle), and the relative speed to each target object are recognized.

Next, the CPU 11 recognizes traveling segments of the own vehicle and another vehicle (step S130). In this processing operation, a known white line recognition process is performed to recognize white lines in an image captured by the camera sensor 31. The white lines serve as boundary lines of the traveling segments. The traveling segments to which the positions of the own vehicle and the other vehicle belong (such as a cruising lane: area between white lines on the left and right sides) are recognized.

Specifically, the traveling segment in which the own vehicle is traveling is recognized. Then, whether or not the traveling segment in which the other vehicle is traveling is the same traveling segment as that of the own vehicle is recognized. In the recognition result, the traveling segment in which the other vehicle is traveling is identified as being the same as the traveling segment in which the own vehicle is traveling or differing from the traveling segment in which the own vehicle is traveling. Alternatively, the traveling segment of the own vehicle or the other vehicle is unknown (unknown state). When the own vehicle or the other vehicle is straddling a white line that serves as a boundary line, the vehicle is recognized as belonging to both traveling segments.

Next, the CPU 11 recognizes the type of the other vehicle (step S140). In this processing operation, regarding the target object that has been recognized as being a vehicle (other vehicle), the absolute speed of the other vehicle is recognized based on the relative movement direction thereof and the speed of the own vehicle.

Then, the movement direction of the other vehicle is identified from the absolute speed. When the movement direction of the other vehicle is in the direction of the own vehicle, the other vehicle is recognized as being an oncoming vehicle. When the movement direction of the other vehicle is the same direction as the traveling direction of the own vehicle, the other vehicle is recognized as being a preceding vehicle. When the other vehicle is stationary, the other vehicle is recognized as being a stationary vehicle. In this processing operation, the other vehicle is classified into an oncoming vehicle, a preceding vehicle, or a stationary vehicle based on the absolute speed of the other vehicle.

Next, the CPU 11 performs a correction amount calculation process based on the vehicle type and the traveling segment (step S150). In this processing operation, a correction amount (segment correction amount) of an actuation reference time TTC_th is set based on the type of the other vehicle and the traveling segment. Here, the actuation reference time TTC_th is a threshold for deciding the timing when control is performed to enable the own vehicle to avoid a collision with a target object. As the actuation reference time TTC_th increases, the start timing for control to avoid collision becomes earlier. As the actuation reference time TTC_th decreases, the start timing for control to avoid collision becomes later.

Figure 4:
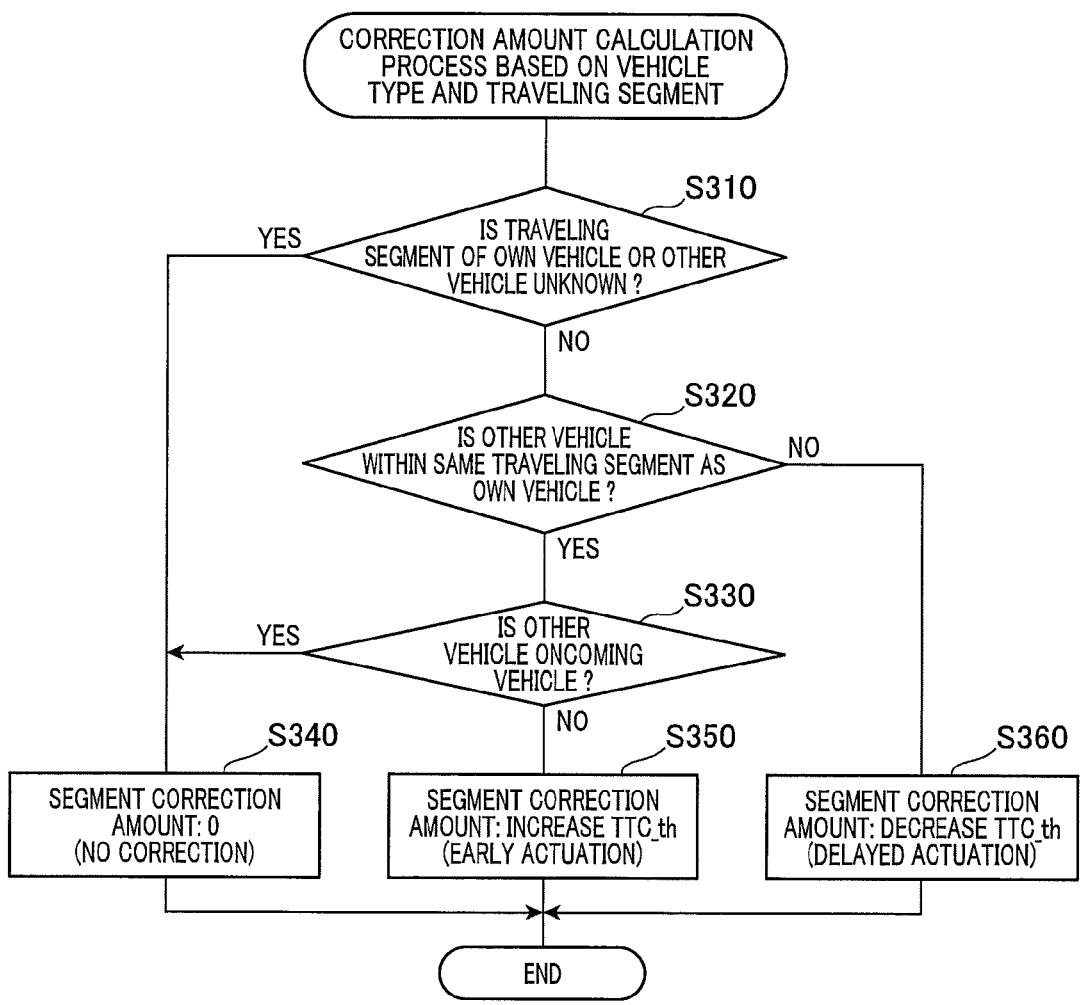
FIG. 4 is a flowchart of a correction amount calculation process based on vehicle type and traveling segment in the collision mitigation process shown in FIG. 2.

In the correction amount calculation process based on the vehicle type and the traveling segment, as shown in FIG. 4, first, the CPU 11 judges whether or not the traveling segment of the own vehicle or the other vehicle is unknown (step S310). When judged that the traveling segment of the own vehicle or the other vehicle is unknown (YES at step S310), the CPU 11 proceeds to step S340, described hereafter.

When judged that traveling segment of the own vehicle or the other vehicle is not unknown (NO at step S310), the CPU 11 judges whether or not the own vehicle and the other vehicle are traveling in the same traveling segment (step S320). When judged that the own vehicle and the other vehicle are traveling in the same traveling segment (YES at step S320), the CPU 11 extracts the type of the other vehicle (step S330).

When judged that the type of the other vehicle is an oncoming vehicle (YES at step S330), the CPU 11 sets the segment correction amount to zero (step S340). In other words, the segment correction amount is set to zero not only when the traveling segment of the own vehicle or the other vehicle is unknown, but also when the own vehicle and the other vehicle are traveling in the same travel segment and the target object is recognized as being an oncoming vehicle.

The segment correction amount when the own vehicle and the other vehicle are traveling in the same traveling segment and the target object is recognized as being an oncoming vehicle is a different value from when the target object is not recognized as being an oncoming vehicle. A reason for this is that collision determination regarding a collision with an oncoming vehicle is required to be performed from a farther distance because the relative speed is greater. Because determination in this instance is difficult, erroneous actuation of the controlled subject 40 is suppressed in this way.

Next, when judged that the type of the other vehicle is not an oncoming vehicle (NO at step S330), the CPU 11 sets the value of the segment correction amount such that the actuation reference time TTC_th increases (such as 0.5 seconds) thereby setting the actuation of control for collision avoidance to be performed earlier (early actuation) (step S350).

In addition, at step S320, when judged that the own vehicle and the other vehicle are traveling in differing traveling segments (NO at step S320), the CPU 11 sets the value of the segment correction amount such that the actuation reference time TTC_th decreases (such as −0.5 seconds) thereby setting the actuation of control for collision avoidance to be performed later (delayed actuation) (step S360). When processing operations such as these are completed, the correction amount calculation process based on the vehicle type and the traveling segment is completed.

Figure 3:
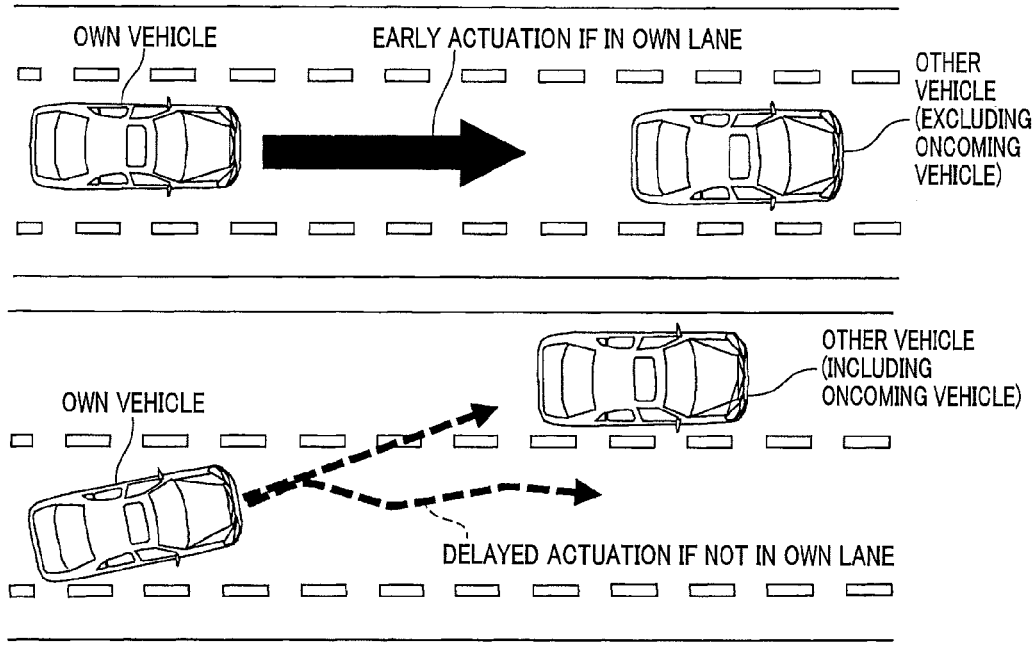
FIGS. 3A and 3B are explanatory diagrams of an overview of actuation in the collision mitigation process.

FIG. 3A shows an overview of an actuation in the collision mitigation process described above. When the process of step S350 is completed (the own vehicle and the other vehicle excluding the oncoming vehicle are traveling in the same traveling segment), early actuation can be performed, as shown in the lower side of FIG. 3A. When the process of step S360 is completed (the own vehicle and the other vehicle including the oncoming vehicle are traveling in the different traveling segments), delayed actuation can be performed, as shown in the upper side of FIG. 3A.

FIG. 3B shows a table summarizing the method for setting the segment correction amounts determined by the correction amount calculation process based on the vehicle type and the traveling segment. Based on the table of FIG. 3B, the actuation reference time TTC_th is increased when the probability of a collision is high. The actuation reference time TTC_th is decreased when the probability of a collision is low. However, the actuation reference time TTC_th is maintained when the relative speed to the other vehicle is high and the uncertainty of a collision is high.

The segment correction amounts corresponding to the decrease and increase in the actuation reference time TTC_th in the table may be set to different values for each vehicle type. Next, returning to the processing flow in FIG. 2, the CPU 11 calculates the actuation reference time TTC_th (step S160). The actuation reference time TTC_th in this processing operation is, for example, arbitrarily set for each vehicle type. However, for example, the actuation reference time TTC_th is set to a timing based on whether collision may or may not be avoided when the driver immediately performs a maneuver to avoid a collision.

Next, the CPU 11 applies the correction amount to the actuation reference time TTC_th and corrects the actuation reference time TTC_th (step S170). In this processing operation, the segment correction amount is added to the actuation reference time TTC_th that has been set at step S160. A new actuation reference time TTC_th is thereby acquired.

Then, based on the behavior of the target object and the relative speed, the CPU 11 calculates a collision time TTC (step S210). The collision time TTC indicates the amount of time until the own vehicle and the target object collide. Next, the CPU 11 compares the collision time TTC and the actuation reference time TTC_th (step S220).

When judged that the collision time TTC is less than the actuation reference time TTC_th (NO at step S220), the CPU 11 generates an automatic braking actuation instruction to actuate the braking system (in other words, sets a flag in the RAM 13) (step S230). Then, the CPU 11 performs an actuation control process (step S250). In the actuation control process, the CPU 11 transmits to the controlled subject 40 the actuation instruction corresponding to the controlled subject 40 (to the respective controlled subjects 40 if a plurality of controlled subjects 40 are present) based on the generated actuation instruction (flag).

In addition, when judged that the collision time TTC is the actuation reference time TTC_th or more (YES at step S220), the CPU 11 performs a setting so as not to generate the automatic braking actuation instruction (in other words, resets the flag in the RAM 13) (step S240). The CPU 11 then performs the above-described actuation control process (step S250).

When the processing operations such as these are completed, the collision mitigation process is completed.

In the PCS 1, described in detail above, the collision mitigation controller 10 sets the actuation reference time TTC_th that serves as a condition for actuating the controlled subject 40 to mitigate collision damage when the own vehicle is in a collision. Then, the collision mitigation controller 10 detects a target object present near the own vehicle. When a condition is met that the collision time TTC is less than the actuation reference time TTC_th, the collision mitigation controller 10 actuates the controlled subject 40. The collision time TTC is set based on the positional relationship between the own vehicle and the target object.

Furthermore, the collision mitigation controller 10 recognizes the own vehicle traveling segment that indicates the traveling segment of the road on which the own vehicle is traveling. The collision mitigation controller 10 recognizes whether or not the target object is present within the own vehicle traveling segment.

In this configuration, when the target object is present within the own vehicle traveling segment, the collision mitigation controller 10 relaxes the actuation reference time TTC_th (increases the actuation reference time TTC_th) compared to that when the target object is not present within the traveling segment. "Relaxing" the actuation reference time TTC_th refers to setting the actuation reference time TTC_th in such a manner that the controlled subject 40 is more easily actuated.

According to the PCS 1 such as this, the magnitude of the possibility of a collision with the target object is judged based on whether or not the target object is present within the own vehicle traveling segment. Therefore, whether or not to perform control can be more appropriately determined.

In particular, when the target object is present within the own vehicle traveling segment, the possibility of a collision is considered higher than when the target object is not present within the own vehicle traveling segment. The actuation reference time TTC_th for the controlled subject 40 is relaxed. Therefore, the controlled subject 40 can be actuated at an earlier stage.

In addition, according to the PCS 1 such as this, a configuration for actuating the controlled subject 40 at an earlier stage can be actualized by simply changing the setting of the actuation reference time TTC_th.

In addition, in the above-described PCS 1, the collision mitigation controller 10 recognizes that the target object is an oncoming vehicle. When the target object is recognized as an oncoming vehicle, an actuation reference time TTC_th that differs from that when the target object is not recognized as an oncoming vehicle is set.

According to the PCS 1 such as this, control can be performed using a different actuation reference time TTC_th regarding oncoming vehicles of which relative speed is high and of which the determination of a collision is difficult.

In addition, in the above-described PCS 1, the collision mitigation controller 10 recognizes an unknown state in which whether or not the target object is present in the traveling segment cannot be recognized. In the unknown state, the collision mitigation controller 10 strengthens the actuation reference time TTC_th (reduces the actuation reference time TTC_th) compared to that when the target object is present within the own vehicle traveling segment. The collision mitigation controller 10 relaxes the actuation reference time TTC_th compared to when the target object is not present within the traveling segment. "Strengthening" the actuation reference time TTC_th refers to setting the actuation reference time TTC_th in such a manner that the controlled subject 40 is less easily actuated.

According to the PCS 1 such as this, in the unknown state, the actuation reference time TTC_th can be set based on the consideration that the possibility of a collision is between that when the target object is present within the own vehicle traveling segment and that when the target object is not present within the own vehicle traveling segment.

When the target object is an oncoming vehicle in the unknown state, the actuation reference time TTC_th is set in a manner similar to the actuation reference time TTC_th for the unknown state.

Here, determination when the target object is an oncoming vehicle is required to be performed from a relatively far distance because the relative speed is high compared to when the target object is a preceding vehicle or a stationary vehicle. The determination of a collision becomes difficult. Therefore, in the present embodiment, when the target object is an oncoming vehicle and is in the unknown state, the actuation reference time TTC_th is set such that control is not performed unless necessary.

According to the PCS 1 such as this, erroneous actuation by the PCS 1 can be suppressed.

Other Embodiments

The present disclosure is not interpreted in any limited manner by the above-described embodiment.

In addition, an embodiment in which a portion of the configuration according to the above-described embodiment is omitted to an extent allowing the issues to be solved is also an embodiment of the present disclosure. In addition, an embodiment in which a plurality of the above-described embodiments are combined accordingly is also an embodiment of the present disclosure. In addition, any embodiment conceivable without departing from the essence of the present disclosure identified only by the recitations in the scope of claims is also an embodiment of the present disclosure.

Furthermore, although reference numbers used in the description of the embodiment are used accordingly in the scope of claims, the reference numbers are used for the purpose of facilitating understanding of each disclosure according to the claims, and are not intended to limit the technical scope of the present disclosure according to each claim.

For example, according to the above-described embodiment, a configuration is given in which recognition accuracy of the target object is improved by use of both the camera sensor 31 and the radar sensor 32. However, the present embodiment can also be actualized by a configuration that includes either of the camera sensor 31 and the radar sensor 32.

In addition, according to the above-described embodiment, when the other vehicle is traveling in the same traveling segment as the own vehicle, the actuation reference time TTC_th is maintained without being relaxed only when the other vehicle is an oncoming vehicle. However, the actuation reference time TTC_th may be maintained or strengthened in instances other than when the other vehicle is an oncoming vehicle, such as for vehicles of which the relative speed is high and the accuracy of collision determination may decrease.

In addition, according to the above-described embodiment, the actuation reference time TTC_th is used as an actuation condition. The actuation reference time TTC_th is changed. However, as the actuation condition, for example, a threshold of the collision probability or the like may be used. In this instance, the collision probability may be changed.

Effects similar to those according to the above-described embodiment can be achieved by the above-described configurations as well.

The PCS 1 is equivalent to a collision mitigation device of the exemplary embodiment. The controlled subject 40 is equivalent to a collision mitigating section of the exemplary embodiment. The processing operations at steps S120 and S220 to S250 are equivalent to actuation control means of the exemplary embodiment. The processing operation at step S130 is equivalent to traveling segment recognizing means of the exemplary embodiment.

Furthermore, the processing operations at steps S170 and S340 to S360 are equivalent to actuation condition setting means of the exemplary embodiment. The processing operations at steps S310 to S330 are equivalent to other vehicle recognizing means. In addition, the processing operation at step S330 is equivalent to oncoming vehicle recognizing means of the exemplary embodiment.

The collision mitigation device (collision mitigation controller 10) may be applied to a collision mitigation program for enabling a computer to actualize means configuring the collision mitigation device. In addition, the elements of the collision mitigation device (collision mitigation controller 10) according to the present embodiment can be selectively combined as needed. In this instance, some configurations may be omitted within the scope of the present disclosure.

What is claimed is:

1. A collision mitigation device that is mounted in an own vehicle and mitigates collision damage when the own vehicle is in a collision, the collision mitigation device comprising:
    actuation condition setting means that sets an actuation condition indicating a condition for actuating a collision mitigating section configured to mitigate collision damage when the own vehicle is in a collision;
    actuation control means that detects a target object that is positioned near the own vehicle, and actuates the collision mitigating section when a positional relationship between the own vehicle and the target object meets the actuation condition;
    traveling segment recognizing means that recognizes an own vehicle traveling segment that indicates a traveling segment of a road on which the own vehicle is traveling; and
    in-segment presence recognizing means that recognizes whether or not the target object is present within the own vehicle traveling segment,
    the actuation condition setting means relaxing the actuation condition in such a manner that the collision mitigating section is more easily actuated when the target object is present within the own vehicle traveling segment, compared to when the target object is not present within the own vehicle traveling segment, wherein:
    the actuation control means determines whether to actuate the collision mitigating section based on a result of a comparison between a collision time and an actuation reference time, the collision time indicating an amount of time until the own vehicle and the target object collide, the actuation reference time being set in advance as a timing when control is performed to enable the own vehicle to avoid a collision with the target object; and the actuation condition setting means sets an amount of actuation reference time to a longer amount of time when the target object is present within the own vehicle traveling segment, compared to when the target object is not present within the own vehicle traveling segment.

2. The collision mitigation device according to claim 1, further comprising oncoming vehicle recognizing means which recognizes that the target object is an oncoming vehicle, wherein the actuation condition setting means sets the actuation condition when the target object is recognized as the oncoming vehicle so as to differ from the actuation condition when the target object is not recognized as the oncoming vehicle.

3. The collision mitigation device according to claim 2, wherein:

the in-segment presence recognizing means recognizes an unknown state in which whether or not the target object is present in the own vehicle traveling segment cannot be recognized; and the actuation condition setting means strengthens the actuation condition in such a manner that the collision mitigating section is less easily actuated when the unknown state is recognized compared to when the target object is present within the traveling segment, and relaxes the actuation condition in such a manner that the collision mitigating section is more easily actuated when the unknown state is recognized compared to when the target object is not present within the traveling segment.

4. The collision mitigation device according to claim 3, wherein:

the in-segment presence recognizing means recognizes an unknown state in which whether or not the target object is present in the own vehicle traveling segment cannot be recognized;

the collision mitigation device further comprises other vehicle recognizing means which recognizes that the target object is a vehicle other than an oncoming vehicle; and the actuation condition setting means sets the actuation condition when the unknown state is recognized and the target object is recognized as the oncoming vehicle so as to be the same as the actuation condition when the unknown state is recognized.

5. The collision mitigation device according to claim 2, wherein:

the in-segment presence recognizing means recognizes an unknown state in which whether or not the target object is present in the own vehicle traveling segment cannot be recognized;

the collision mitigation device further comprises other vehicle recognizing means which recognizes that the target object is a vehicle other than an oncoming vehicle; and the actuation condition setting means sets the actuation condition when the unknown state is recognized and the target object is recognized as the oncoming vehicle so as to be the same as the actuation condition when the unknown state is recognized.

6. The collision mitigation device according to claim 1, further comprising oncoming vehicle recognizing means which recognizes that the target object is an oncoming vehicle, wherein the actuation condition setting means sets the actuation condition when the target object is recognized as the oncoming vehicle so as to differ from the actuation condition when the target object is not recognized as the oncoming vehicle.

7. The collision mitigation device according to claim 6, wherein:

the in-segment presence recognizing means recognizes an unknown state in which whether or not the target object is present in the own vehicle traveling segment cannot be recognized; and the actuation condition setting means strengthens the actuation condition in such a manner that the collision mitigating section is less easily actuated when the unknown state is recognized compared to when the target object is present within the traveling segment, and relaxes the actuation condition in such a manner that the collision mitigating section is more easily actuated when the unknown state is recognized compared to when the target object is not present within the traveling segment.

8. The collision mitigation device according to claim 7, wherein:

the in-segment presence recognizing means recognizes an unknown state in which whether or not the target object is present in the own vehicle traveling segment cannot be recognized;

the collision mitigation device further comprises other vehicle recognizing means which recognizes that the target object is a vehicle other than an oncoming vehicle; and the actuation condition setting means sets the actuation condition when the unknown state is recognized and the target object is recognized as the oncoming vehicle so as to be the same as the actuation condition when the unknown state is recognized.

9. The collision mitigation device according to claim 6, wherein:

the in-segment presence recognizing means recognizes an unknown state in which whether or not the target object is present in the own vehicle traveling segment cannot be recognized;

the collision mitigation device further comprises other vehicle recognizing means which recognizes that the target object is a vehicle other than an oncoming vehicle; and the actuation condition setting means sets the actuation condition when the unknown state is recognized and the target object is recognized as the oncoming vehicle so as to be the same as the actuation condition when the unknown state is recognized.

10. The collision mitigation device according to claim 1, wherein the traveling segment recognizing means recognizes the own vehicle traveling segment based on a white line in a captured image.

* * * * *